May 28, 1940.　　　　J. FAIST　　　　2,202,340
SCREW CUTTING NIPPER
Filed Oct. 18, 1938
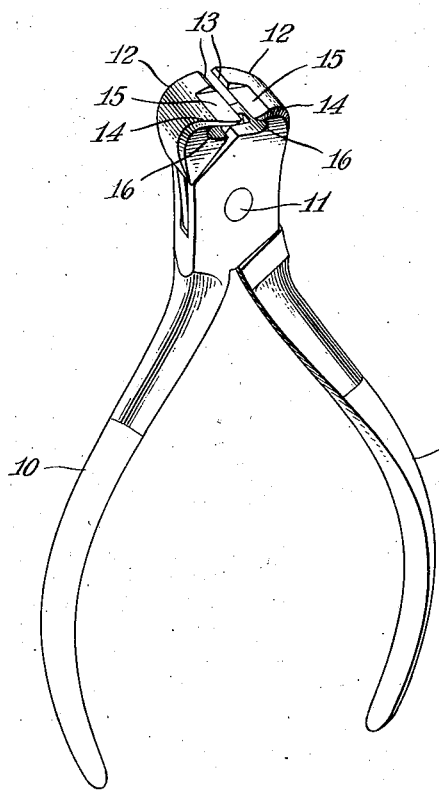
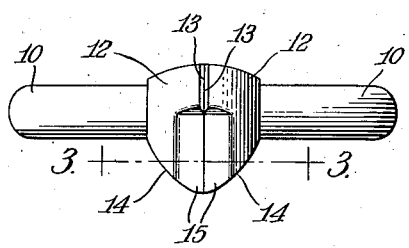
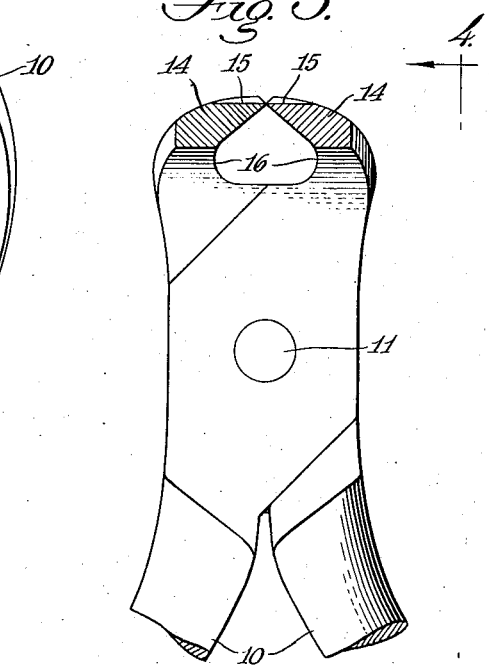
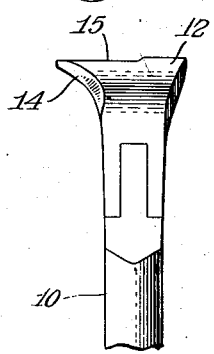
Jacob Faist,
INVENTOR
BY Victor J. Evans & Co.
ATTORNEYS Patented May 28, 1940

2,202,340

UNITED STATES PATENT OFFICE 2,202,340

SCREW CUTTING NIPPER

Jacob Faist, Closter, N. J.

Application October 18, 1938, Serial No. 235,679

1 Claim. (Cl. 30—186)

This invention relates to screw cutting nippers and has for an object to provide a device of this character particularly adapted for use in cutting off the ends of screws, rivets or dowel pins after they have been fastened into the frames or mountings on eye glasses.

A further object is to provide a nipper having a flat projecting front cutting portion of the jaws, the jaws being cut away underneath these cutting portions to provide sufficient clearance when cutting off the screws on bridge mountings where the pad arms are close to the straps.

A further object is to provide a nipper of this character which will be inexpensive to manufacture, which will be strong and durable, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a perspective view of an optical screw cutting nipper, constructed in accordance with the invention.

Figure 2 is a plan view of the nipper shown in Figure 1.

Figure 3 is a detail cross sectional view taken on the line 3—3 of Figure 2 showing the flat projecting portion of the jaws cut away to provide clearance below the jaws.

Figure 4 is a fragmentary end elevation of the nippers shown in Figure 1.

Referring now to the drawing in which like characters of reference designate similar parts in the various views, the screw cutting nipper includes a pair of crossed handles 10 pivotally connected together at their crossing through the medium of a pivot pin 11. The outer end portions of the handles are turned inwardly toward each other beyond the pivot to provide jaws 12 which are sharpened to form cutting edges 13.

The front ends of the jaws project forwardly beyond the faces of the handles as best shown in Figure 2, to provide screw cutting jaws 14 while the jaws 12 may be used to cut rivets, dowel pins or other work requiring strong cutting edges. The screw cutting jaws 14 are provided with flat upper faces 15 which reduce the thickness of the jaws so that these relatively thin jaws may be sharpened to a fine edge and at the same time may be easily inserted in close almost inaccessible places for cutting off screws such as the screws and bridge mountings of eye glasses wherever the pads are close to the straps.

By referring to Figure 3 it will be seen that the underneath faces of the strong cutting jaws 12 and the thin screw cutting jaws 14, are cut away as shown at 16, to provide sufficient clearance for screw heads and projecting parts on work from which minute screws must be severed.

From the above description it is thought that the construction and operation of the invention will be fully understood without further explanation.

What is claimed is:

A nipper comprising, a pair of crossed handles pivotally connected together at their crossing, the outer end portions of the handles being turned inwardly toward each other beyond the pivot and sharpened to provide strong cutting jaws, the front ends of the jaws projecting outwardly beyond the side faces of said outer end portions of the handles and having portions of the outer end flat to reduce thickness and to provide relatively thin screw cutting jaws for insertion in almost inaccessible places and the remaining portions projecting slightly forward beyond said flat portions, said strong cutting jaws and said screw cutting jaws being cut away obliquely on their inner sides to provide clearance for screw heads and projecting parts on work from which screws must be severed.

JACOB FAIST.